(12) United States Patent
Chang (10) Patent No.: US 12,504,859 B2
(45) Date of Patent: Dec. 23, 2025

(54) MOUSE DEVICE AND CONTROL METHOD

(71) Applicant: HON HAI PRECISION INDUSTRY CO., LTD., New Taipei (TW)

(72) Inventor: Ke-Ping Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 280 days.

(21) Appl. No.: 18/051,876

(22) Filed: Nov. 1, 2022

(65) Prior Publication Data
US 2024/0094859 A1    Mar. 21, 2024

(30) Foreign Application Priority Data
Sep. 19, 2022 (TW) .................................. 111135368

(51) Int. Cl.
*G06F 3/0354* (2013.01)
*G06F 3/04812* (2022.01)
*G06F 3/04842* (2022.01)

(52) U.S. Cl.
CPC ...... *G06F 3/04812* (2013.01); *G06F 3/03543* (2013.01); *G06F 3/04842* (2013.01)

(58) Field of Classification Search
CPC ............. G06F 3/04812; G06F 3/03543; G06F 3/04842; G06F 3/0383
See application file for complete search history.

(56) References Cited

U.S. PATENT DOCUMENTS

| | | | | |
|---|---|---|---|---|
| 5,832,266 A | * | 11/1998 | Crow ..................... | G06F 3/0489 719/316 |
| 7,623,116 B1 | * | 11/2009 | Bidiville ............... | G06F 3/0362 345/161 |
| 2002/0190955 A1 | * | 12/2002 | Chen ..................... | G06F 3/0219 345/168 |
| 2006/0274044 A1 | * | 12/2006 | Gikandi .............. | G06F 3/03543 345/163 |
| 2008/0141125 A1 | * | 6/2008 | Ghassabian ........... | G06F 40/242 715/261 |
| 2009/0007012 A1 | * | 1/2009 | Mandic ................. | G06F 40/166 715/810 |
| 2010/0205561 A1 | * | 8/2010 | Chen ..................... | G06F 3/0481 715/810 |
| 2012/0192176 A1 | * | 7/2012 | Shah ....................... | G06F 9/452 718/1 |
| 2013/0285907 A1 | * | 10/2013 | Lai ...................... | G06F 3/03543 345/158 |

FOREIGN PATENT DOCUMENTS

| | | |
|---|---|---|
| CN | 103324317 A | 9/2013 |
| TW | 200421159 A | 10/2004 |
| TW | 201030564 A1 | 8/2010 |
| TW | 202202976 A | 1/2022 |

* cited by examiner

*Primary Examiner* — Reji Kartholy
(74) *Attorney, Agent, or Firm* — CKC & Partners Co., LLC (57) ABSTRACT

A mouse device is disclosed. The mouse device is coupled to a computer device. The mouse device includes a first button, a second button, and a processor. The processor is configured to generate at least one signal according to a first state of the first button and a second state of the second button at the same time, and the processor is configured to transmit the at least one signal to the computer device, so that the computer device performs one of a copy operation and a cut operation according to the at least one signal.

2 Claims, 4 Drawing Sheets

400

```
┌─────────────────────────────────────────────────┐
│ generating at least one signal according to a   │
│ first state of a first button of a mouse device │
│ and a second state of a second button of the    │──── S410
│ mouse device at the same time, and transmitting │
│ the at least one signal to a computer device    │
└─────────────────────────────────────────────────┘
                        │
                        ▼
┌─────────────────────────────────────────────────┐
│ generating a paste signal according to a third  │
│ state of the first button or the second button, │──── S430
│ and transmitting the paste signal to the        │
│ computer device                                 │
└─────────────────────────────────────────────────┘
```

MOUSE DEVICE AND CONTROL METHOD

RELATED APPLICATIONS

This application claims priority to Taiwan Application Serial Number 111135368, filed Sep. 19, 2022, which is herein incorporated by reference.

BACKGROUND

Field of Invention

The present disclosure relates to a mouse device and a control method. More particularly, the present disclosure relates to a mouse device and a control method including an additional button or three buttons.

Description of Related Art

When performing word processing on a computer, it is usually necessary to use the copy and paste or cut and paste function. However, when using a traditional mouse to perform the above functions, multiple steps must be performed, which include:
  Step 1: Move the mouse cursor to a start point of a part that needs to be copied or cut out in the file;
  Step 2: Hold down the left mouse button (make a single click and long press on the left mouse button), and move the mouse so that the highlighted area covers the part in the file that needs to be copied or cut;
  Step 3: Release the left mouse button (the left mouse button is released from the single-click long-pressed state);
  Step 4: Confirm that the mouse cursor is located in the highlighted area and single click on the right mouse button;
  Step 5: Move the mouse cursor to select "Copy" or "Cut" in the pop-up list dialog box;
  Step 6: Move the mouse cursor to a start point of a part that needs to be pasted in the file and single click on the left mouse button;
  Step 7: Single click on the right mouse button to generate the list dialog box; and
  Step 8: Move the mouse cursor to select one of the various "Paste" options in the pop-up list dialog box and paste.

The above steps still have room for simplification to satisfy the need of improving the efficiency of word processing.

Although the functions of copying, cutting, and pasting can be simplified by using a mouse in cooperation with a keyboard, this method requires the use of the keyboard and the mouse, and requires both hands to perform the function of copying and pasting or cutting and pasting. There is still room for simplifying the above operations.

For the foregoing reason, there is a need to solve the above-mentioned problem by providing a mouse device and a control method.

SUMMARY

Some embodiments of the present disclosure provide a mouse device. The mouse device is coupled to a computer device. The mouse device includes a first button, a second button, and a processor. The processor is configured to generate at least one signal according to a first state of the first button and a second state of the second button, and the processor is configured to transmit the at least one signal to the computer device, so that the computer device performs an operation correspondingly according to the at least one signal. The corresponding operation includes one of a copy operation and a cut operation.

Some embodiments of the present disclosure provide a mouse device. The moused device is coupled to a computer device. The mouse device includes an additional button, a left button, and a processor. When the additional button and the left button are in a single-click long-press state at the same time, the processor transmits a copy range starting signal to the computer device. When the additional button is in the single-click long-press state and at the same time the left button is in a double-click long-press state, the processor transmits a cut range starting signal to the computer device. When the additional button and the left button are released from the single-click long-press state at the same time, the processor transmits a copy signal to the computer device. When the additional button and the left button are released from the single-click long-press state and the double-click long-press state at the same time, the processor transmits a cut signal to the computer device.

Some embodiments of the present disclosure provide a control method adapted for a mouse device coupled to a computer device. The control method includes the following steps: generating at least one signal according to a first state of a first button of the mouse device and a second state of a second button of the mouse device at the same time by a processor of the mouse device, and transmitting the at least one signal to the computer device by the processor of the mouse device; and generating a paste signal according to a third state of the first button or the second button and transmitting the paste signal to the computer device by the processor. The at least signal includes one of a copy signal and a cut signal.

It is to be understood that both the foregoing general description and the following detailed description are by examples, and are intended to provide further explanation of the disclosure as claimed.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure. In the drawings.

DESCRIPTION OF THE EMBODIMENTS

The following disclosure provides many different embodiments, or examples, for implementing different features of the provided subject matter. Specific examples of components and arrangements are described below to simplify the present disclosure. Any examples discussed herein are for illustration purposes only and do not in any way limit the scope and meaning of the present disclosure or its examples In this document, the term "coupled" may also be termed "electrically coupled," and the term "connected" may be termed "electrically connected." "Coupled" and "connected" may also be used to indicate that two or more components cooperate or interact with each other.

Figure 1:
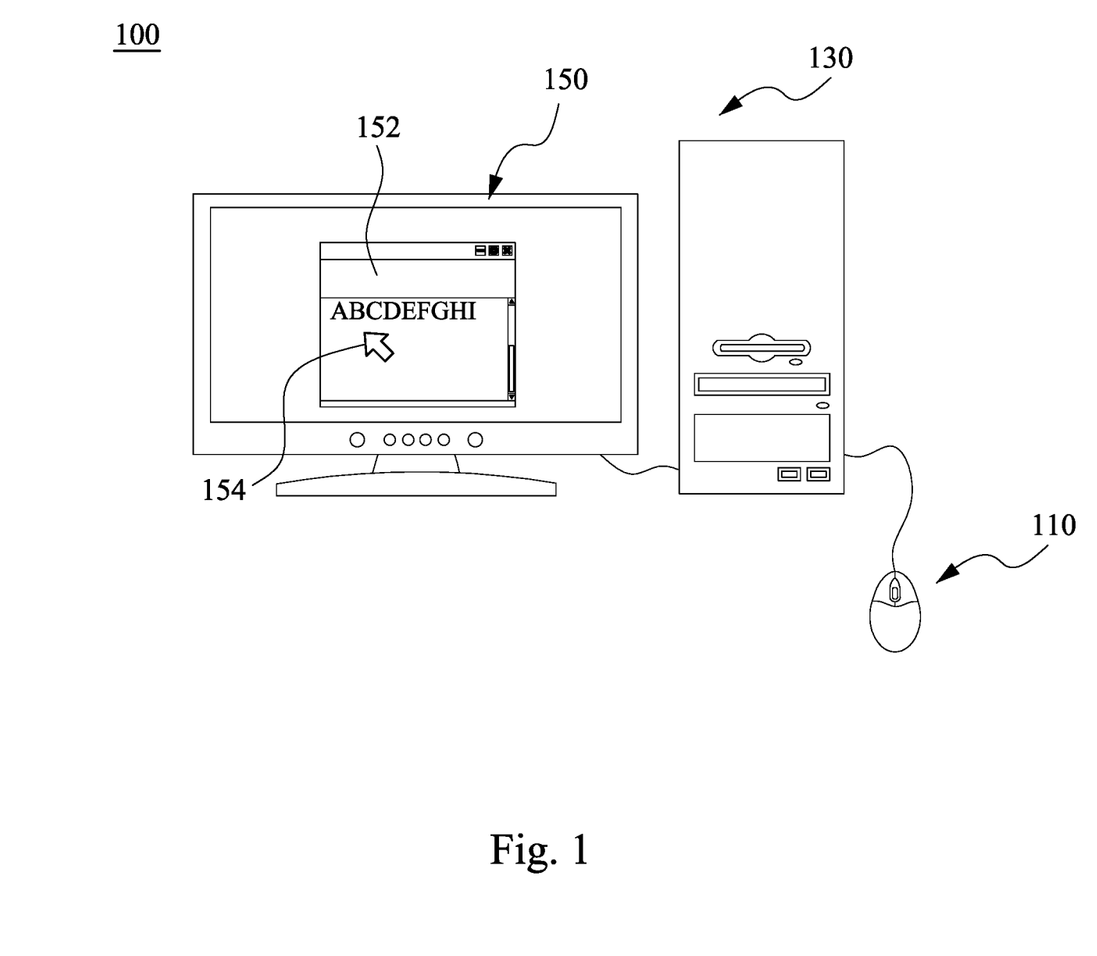
FIG. 1 depicts a schematic diagram of a computer system according to some embodiments of the present disclosure.

A description is provided with reference to FIG. 1. FIG. 1 depicts a schematic diagram of a computer system 100 according to some embodiments of the present disclosure. As shown in FIG. 1, the computer system 100 includes a mouse device 110, a computer device 130, and a screen 150. As for connection relationships, the mouse device 110 is coupled to the computer device 130, and the computer device 130 is coupled to the screen 150.

The mouse device 110, the computer device 130, and the screen 150 may be connected in a wired or wireless manner. The connection method shown in FIG. 1 only serves as an example for illustration, and the embodiments of the present disclosure are not limited thereto. In addition, the computer device 130 and the screen 150 are integrally formed in some embodiments.

As shown in FIG. 1, the screen 150 includes a screen window 152 and cursor 154. In some embodiments, the computer device 130 receives a signal transmitted by the mouse device 110, and controls the cursor 154 to perform an operation on the screen 150 correspondingly according to the signal transmitted by the mouse device 110.

Figure 2:
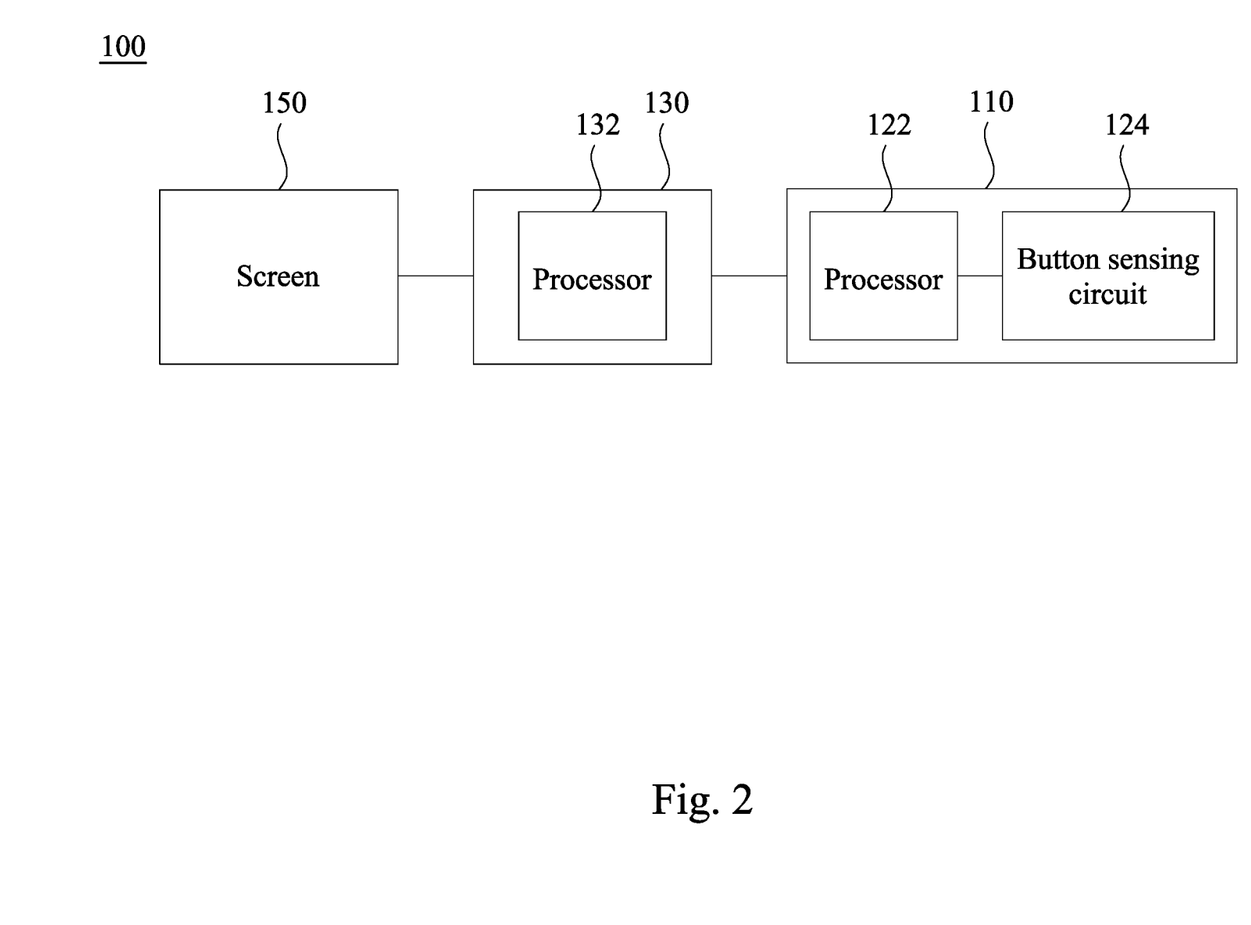
FIG. 2 depicts a schematic diagram of a computer system according to some embodiments of the present disclosure.

A description is provided with reference to FIG. 2. FIG. 2 depicts a schematic diagram of the computer system 100 according to some embodiments of the present disclosure. The computer system 100 shown in FIG. 2 is a circuit structure diagram of the computer system 100 in FIG. 1. As shown in FIG. 2, the mouse device 110 includes a processor 122 and a button sensing circuit 124. As for a connection relationship, the button sensing circuit 124 is coupled to the processor 122. The computer device 130 includes a processor 132.

In some embodiments, each of the mouse device 110, the computer device 130, and the screen 150 further includes an input/output circuit (not shown in the figure), which is configured for inputting and outputting signals.

Figure 3:
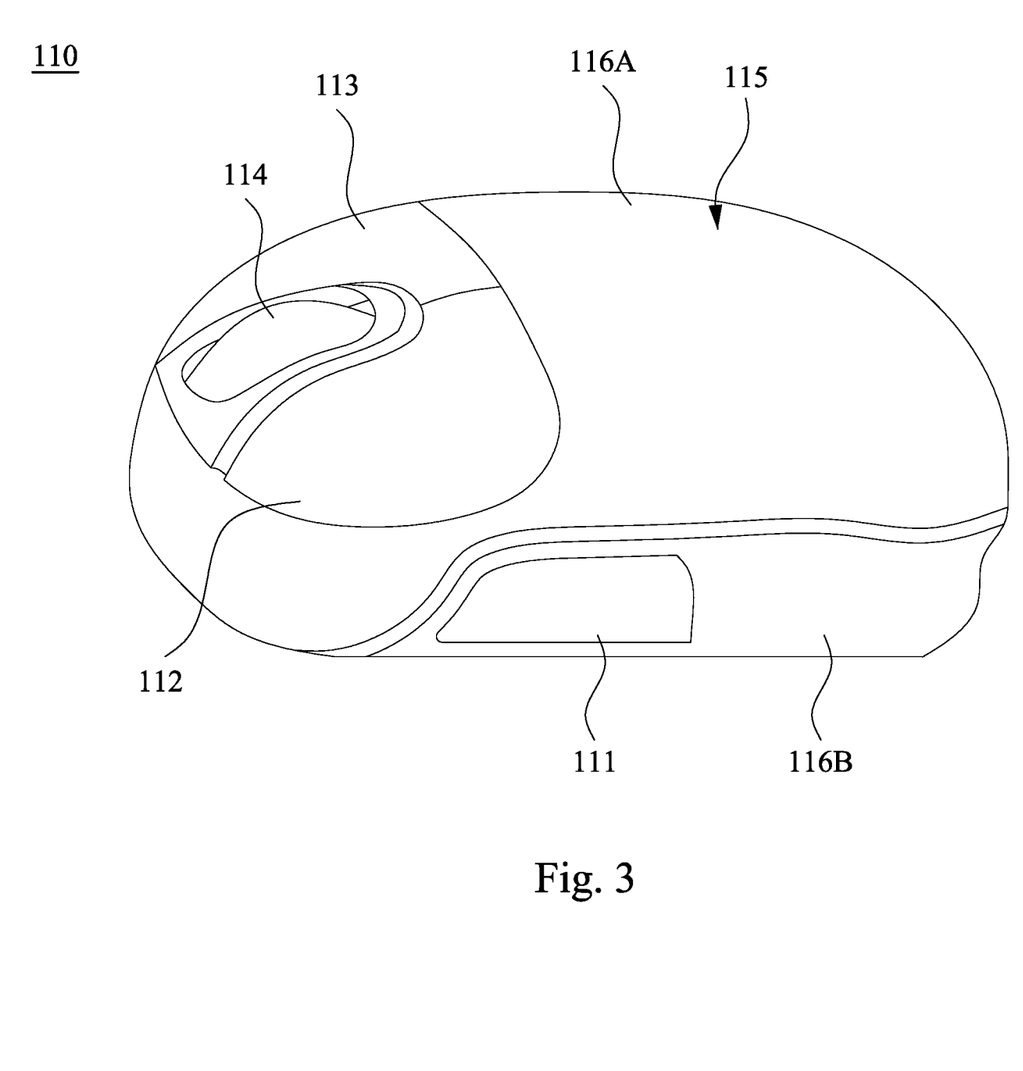
FIG. 3 depicts a schematic diagram of a mouse device according to some embodiments of the present disclosure.

A description is provided with reference to FIG. 3. FIG. 3 depicts a schematic diagram of the mouse device 110 according to some embodiments of the present disclosure. The mouse device 110 shown in FIG. 3 is used to represent a structural diagram of the mouse device 110 in FIG. 1. As shown in FIG. 3, the mouse device 110 includes a button 111, a button 112, and a button 113. In some embodiments, the button 111 is an additional button, the button 112 is a left button, and the button 113 is a right button.

Additionally, as shown in FIG. 3, the mouse device 110 includes a housing 115. The housing 115 includes an upper housing surface 116A and a side housing surface 116B. In some embodiments, the button 111 is located on the side housing surface 116B, and the button 112 and the button 113 are located on the upper housing surface 116A.

The above button 112 and button 113 are the left button and the right button that are commonly seen in mouse devices on the market. As compared with the button 112 and the button 113, the button 111 is an additional button related to some embodiments of the present disclosure. Operations of other embodiments of the present disclosure may not require this additional button. The embodiments of the present disclosure are not limited to the mouse device 110 having the button 111.

I some embodiments, as shown in FIG. 3, the button 111 is located on a left side of the mouse device 110. Under the circumstance that the button 111 is located on the left side of the mouse device 110 as shown in FIG. 3, it is more convenient for a right-handed user to operate the mouse device 110. For example, the right-handed user can place the thumb of the right hand on the button 111, place the index finger of the right hand on the button 112, and place the middle finger of the right hand on the button 113 when operating the mouse device 110. However, the embodiments of the present disclosure are not limited to the button 111 being located on the left side of the mouse device 110.

In some embodiments, the mouse device 110 further includes a scroll wheel 114.

A detailed operation method of the computer system 100 of FIG. 1 and FIG. 2 and the mouse device 110 of FIG. 3 is described as follows with reference to the other figure. In addition to that, the computer system 100 of FIG. 1 and FIG. 2 and the mouse device 110 of FIG. 3 only serve as an example for illustration purposes, and the embodiments of the present disclosure are not limited thereto.

Figure 4:
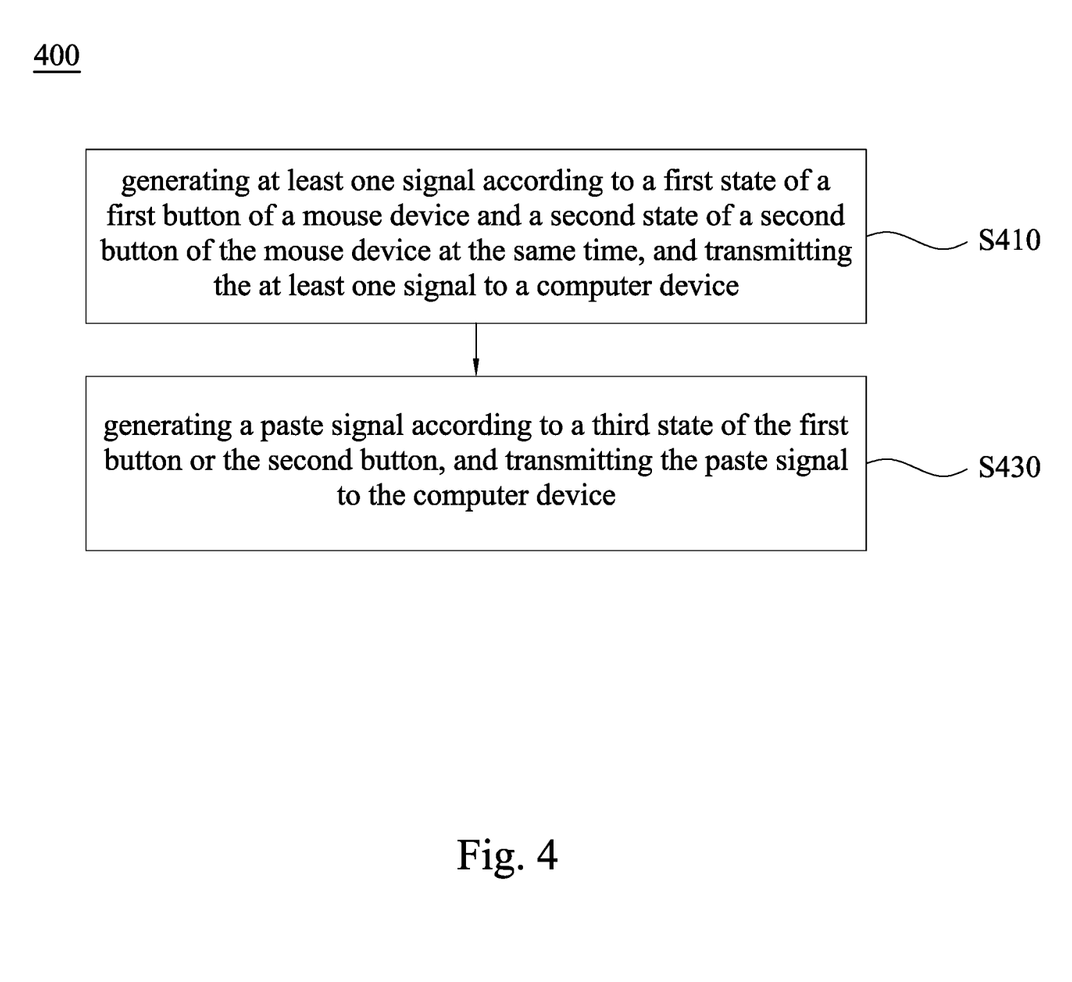
FIG. 4 depicts a flowchart of a control method according to some embodiments of the present disclosure.

A description is provided with reference to FIG. 4. FIG. 4 depicts a flowchart of a control method 400 according to some embodiments of the present disclosure. The embodiments of the present disclosure are not limited thereto.

It is noted that the control method 400 can be applied to a system and a device having the same or similar structures as those of the computer system 100 of FIG. 1 and FIG. 2 and the mouse device 110 of FIG. 3. In order to simplify the description, in the following the computer system 100 of FIG. 1 and FIG. 2 and the mouse device 110 of FIG. 3 are taken as an example to describe the operation method. However, the embodiments of the present disclosure are not limited to the above application.

It is noted that the control method 400 may be implemented as a computer program in some embodiments, and stored in a non-transitory computer-readable medium, so that a computer, an electronic device, or the previously mentioned processor 122 shown in FIG. 2, or the processor 132 reads the recording medium and then performs the operation method. The processor 122 or the processor 132 may be composed of one or more chips. The non-transitory computer-readable recording medium may be a read-only memory, a flash memory, a floppy disk, a hard disk, an optical disc, a flash disk, a magnetic tape, a database accessible through a network, or a non-transitory computer-readable recording medium with the same function that can be readily conceived of by those skilled in the art.

In addition, it should be understood that the operations of the control method 400 described in the present embodiment, unless their order is otherwise specified, can be adjusted depending on practical needs, or even can be performed simultaneously or partially simultaneously.

Additionally, these operations may be adaptively added, replaced, and/or omitted in different embodiments.

A description is provided with reference to FIG. 4. The control method 400 includes a step S410 and a step S430.

In step S410, at least one signal is generated according to a first state of a first button of a mouse device and a second state of a second button of the mouse device at the same time, and the at least one signal is transmitted to a computer device. A description is provided with reference to FIG. 2. In some embodiments, step S410 can be performed by the processor 122 shown in FIG. 2.

In some embodiments, the at least one signal includes a copy signal and a cut signal.

A description is provided with reference to FIG. 1 to FIG. 3. In some embodiments, the button sensing circuit 124 of the mouse device 110 in FIG. 2 senses a state of the button 111 and a state of the button 112 in FIG. 3. In some embodiments, the button sensing circuit 124 further senses a state of the button 113 in FIG. 3. Then, the button sensing circuit 124 transmits the state of the button 111, the state of the button 112, and/or the state of the button 113 to the processor 122. The processor 122 generates various signals according to the state of the button 111, the state of the button 112 and/or the state of the button 113, and transmits these signals to the computer device 130.

In some embodiments, the state of each of the button 111, the button 112, and the button 113 may be a single-click state, a double-click state, a single-click long-press state, a double-click long-press state, a single-click long-press releasing state, and a double-click long-press releasing state. The single-click state is caused by the finger to click the button once. The double-click state is caused by the finger to click the button twice within a short period of time. The single-click long-press state is caused by the finger to click the button once and then the finger does not bounce back but continues to press the button. The double-click long-press state is caused by the finger to click the button once and then the finger bounces back and clicks the button again within a short period of time, and the finger does not bounce back after clicking the button for a second time but continues to press the button. The releases of the single-click long-press releasing state and the double-click long-press releasing state are caused by the finger to bounce back so as to release its continuous pressing of the button. The above states only serve as an example for illustration purposes, and the embodiments of the present disclosure are not limited thereto. For example, triple-click may be one state of implementation.

In some embodiments, in step S410, when the button 111 and the button 112 are in the single-click long-press state at the same time, the processor 122 generates a copy range starting signal and transmits this signal to the computer device 130. When the button 111 and the button 112 are released from the single-click long-press state at the same time, the processor 122 generates the copy signal and transmits this signal to the computer device 130. The computer device 130 sets a copy range start point and a copy range end point from a point correspondingly on the screen window 152 of the computer device 130 (such as the cursor 154 corresponding to the mouse device 110 at this time) according to the received copy range starting signal and the copy signal. The computer device 130 performs a copy operation according to the copy range start point and the copy range end point. When the button 111 is in the single-click long-press state and the button 112 is in the double-click long-press state at the same time, the processor 122 generates a cut range starting signal and transmits this signal to the computer device 130. When the button 111 and the button 112 are released from the single-click long-press state and the double-click long-press state at the same time, the processor 122 generates the cut signal and transmits this signal to the computer device 130. The computer device 130 sets a cut range start point and a cut range end point from a point correspondingly on the screen window 152 of the computer device 130 (such as the cursor 154 corresponding to the mouse device 110 at this time) according to the received cut range starting signal and the cut signal. The computer device 130 performs a cut operation according to the cut range start point and the cut range end point. After the computer device 130 performs the copy operation or the cut operation, the processor 122 generates a paste signal and transmits this signal to the computer device 130 when the button 111 is in the single-click state. The computer device 130 performs a paste operation according to the paste signal.

The above steps only serve as an example for illustration purposes, and the embodiments of the present disclosure are not limited thereto. For example, the combination of button states or the state of one single button can be freely selected by using the button 111, the button 112, and the button 113 on the mouse device 110. For example, when the button 112 and the button 113 (not the button 111 and the button 112 described above) are in the single-click long-pressed state at the same time, the processor 122 generates the copy range starting signal. Or, when the button 112 (not the button 111 described above) is in the single-click state, the processor 122 generates the paste signal.

In step S430, the paste signal is generated according to a third state of the first button or the second button, and the paste signal is transmitted to the computer device. A description is provided with reference to FIG. 2. In some embodiments, step S430 can be performed by the processor 122 shown in FIG. 2.

A description is provided with reference to FIG. 1 to FIG. 3. In some embodiments, step S430 further includes performing at least one operation correspondingly according to the at least one signal by the computer device 130. For example, when the computer device 130 receives the copy signal, the processor 132 of the computer device 130 performs the copy operation according to the copy signal and displays the copy operation result on the screen 150. When the computer device 130 receives the cut signal, the processor 132 of the computer device 130 performs the cut operation according to the cut signal and displays the cut operation result on the screen 150. When the computer device 130 receives the paste signal, the processor 132 of the computer device 130 performs the paste operation according to the paste signal and displays the paste operation result on the screen 150. For example, when the computer device 130 receives the paste signal, the processor 132 of the computer device 130 determines a start point of the paste operation according to the cursor 154 corresponding to the mouse device 110 when the paste signal is received, and pastes the content in a copy range or a cut range according to the copy range or cut range determined when performing the copy operation or the cut operation.

A description is provided with reference to FIG. 1 to FIG. 3. An example is provided to illustrate copy and paste and their corresponding operations as follows.

In some embodiments, when a user single clicks and long presses the button 111 and holds down the button 111, and at the same time single clicks the button 112 and then holds down the button 112 (that is, long presses the button 112), or when the user single clicks and long presses the button 111 and holds down the button 111, and within a short period of time single clicks the button 112 and then holds down the button 112 (that is, long presses the button 112), the button sensing circuit 124 senses that the states of the button 111 and the button 112 are the single-click long-press state at the same time, and transmits state information of the button 111 and the button 112 to the processor 122. When the states of the button 111 and the button 112 are the single-click long-press state at the same time, the processor 122 generates the copy range starting signal and transmits the copy range starting signal to the processor 132 of the computer device 130. The processor 132 sets the copy range start point at a position where the cursor 154 in FIG. 1 is located according to the copy range starting signal. For example, if the position of the cursor 154 is a position corresponding to the mouse device 110 when the computer device 130 receives the copy range starting signal, the position of the cursor 154 is also a position of the copy range start point. For example, if the cursor 154 is located at a position of a character B on the screen 152, the processor 132 sets the copy range start point at the position of the character B.

In some embodiments, long press means that the button is pressed for at least a set time threshold. For example, the time threshold may be, but not limited to, 0.5 seconds, 1 second.

It is noted that, no matter whether the user first presses the button 111 and holds down the button 111 and then presses the button 112 and holds down the button 112 at the same time, or the user first presses the button 112 and holds down the button 112 and then presses the button 111 and holds down the button 111 at the same time, or the user presses the button 111 and the button 112 and holds down the button 111 and the button 112 at the same time, the button sensing circuit 124 can all sense that the button 111 and the button 112 are in a long-press state at the same time.

In some embodiments, when the states of the button 111 and the button 112 are the single-click long-press state at the same time, the processor 122 generates the copy range starting signal and transmits the copy range starting signal to the computer device 130. Next, the computer device 130 will wait to receive the copy signal from the mouse device 110 as an end signal to determine a range to be copied.

After the states of the button 111 and the button 112 are the single-click long-press state at the same time, the button sensing circuit 124 senses that the button 111 and the button 112 are released from the single-click long-press state at the same time if the user releases both the button 111 and the button 112. The button sensing circuit 124 transmits the sensed state information of the button 111 and the button 112 to the processor 122. The processor 122 generates the copy signal and transits the copy signal to the computer device 130, so that the processor 132 of the computer device 130 can perform the copy operation according to the previously received copy range starting signal and the currently received copy signal.

In greater detail, if it is assumed that when the states of the button 111 and the button 112 are the single-click long-press state at the same time, the cursor 154 in FIG. 1 is located at the position of the character B on the screen window 152. The processor 132 sets the copy range start point at the position of the character B. Then, under the circumstance that the button 111 and the button 112 are still in the single-click long-press state at the same time, the mouse device 110 is moved from the position of the character B to a position of a character D. At this time, the button 111 and the button 112 are released from the single-click long-press state at the same time after the mouse device 110 is moved to the position of the character D. The processor 132 sets an end point at the position of the character D. The processor 132 selects the character B, a character C, and the character D on the screen window 152. Finally, the processor 132 copies the character B, the character C, and the character D according to the copy signal when the states of the button 111 and the button 112 are the single-click long-press releasing state at the same time.

After the processor 132 copies the character B, the character C, and the character D according to the copy signal, the cursor 154 will be moved to another position on the screen window 152 if the user moves the mouse device 110. For example, it is assumed that the cursor 154 is moved after a character I. At this time, the processor 122 generates at least one type of paste signal according to at least one of the state of the button 111, the state of the button 112, and the state of the button 113, and transmits the paste signal to the computer device 130. The computer device 130 performs the paste operation after the character I according to the paste signal.

In some embodiments, the embodiments of the present disclosure may include multiple types of paste signals. Each of the multiple types of paste signals corresponds to the state of at least one of the button 111, the button 112, and the button 113.

For example, in one embodiment, when the user single clicks on the button 111, the button sensing circuit 124 senses that the button 111 is in the single-click state. The processor 122 generates a first paste signal and transmits the first paste signal to the computer device 130. According to the first paste signal, the processor 132 of the computer device 130 pastes the previously copied character B, character C, and character D after the character I in a "normal paste" manner.

In another embodiment, when the user single clicks on the button 112, the button sensing circuit 124 senses that the button 112 is in the single-click state. The processor 122 generates a second paste signal and transmits the second paste signal to the computer device 130. According to the second paste signal, the processor 132 of the computer device 130 pastes the previously copied character B, character C, and character D after the character I in a "keep source formatting" manner.

In still another embodiment, when the user single clicks on the button 113, the button sensing circuit 124 senses that the button 113 is in the single-click state. The processor 122 generates a third paste signal and transmits the third paste signal to the computer device 130. According to the third paste signal, the processor 132 of the computer device 130 pastes the previously copied character B, character C, and character D after the character I in a "keep text only" manner.

In yet another embodiment, when the user double clicks on the button 111, the button sensing circuit 124 senses that the button 111 is in the double-click state. The processor 122 generates a fourth paste signal and transmits the fourth paste signal to the computer device 130. According to the fourth paste signal, the processor 132 of the computer device 130 pastes the previously copied character B, character C, and character D after the character I in a "picture" manner.

In another embodiment, when the user single clicks on the button 111 and the button 112 at the same time, the button sensing circuit 124 senses that the button 111 and the button 112 are in the single-click state at the same time. The processor 122 generates a fifth paste signal and transmits the fifth paste signal to the computer device 130. According to the fifth paste signal, the processor 132 of the computer device 130 pastes the previously copied character B, character C, and character D after the character I in a "use destination theme" manner.

The above states of the button 111, the button 112, and the button 113 and the paste methods corresponding to them only serve as an example for illustration purposes, and the embodiments of the present disclosure are not limited thereto. For example, the combination of button states or the state of one single button can be freely selected by using the button 111, the button 112, and the button 113 on the mouse device 110. For example, when the button 112 and the button 113 (not the button 111 and the button 112 described above) are in the single-click state at the same time, the processor 122 generates the fifth paste signal. Or, when the button 112 (not the button 111 described above) is in the single-click state, the processor 122 generates the first paste signal.

A description is provided with reference to FIG. 1 to FIG. 3. An example is provided to illustrate cut and paste and their corresponding operations as follows.

In some embodiments, when the user single clicks and long presses the button 111 and holds down the button 111, and at the same time double clicks the button 112 and then holds down the button 112 (that is, long presses the button 112), or when the user single clicks and long presses the button 111 and holds down the button 111, and within a short period of time double clicks the button 112 and then holds down the button 112 (that is, long presses the button 112), the button sensing circuit 124 senses that the state of the button 111 is the single-click long press state and at the same time the state of the button 112 is the double-click long-press state. The button sensing circuit 124 transmits the states of the button 111 and the button 112 to the processor 122. According to the above states of the button 111 and the button 112, the processor 122 generates the cut range starting signal and transmits the cut range starting signal to the processor 132 of the computer device 130. The processor 132 sets the cut range start point at the position where the cursor 154 in FIG. 1 is located according to the cut range starting signal. For example, if the cursor 154 is located at the position of the character B on the screen window 152, the processor 132 sets the cut range start point at the position of the character B.

It is noted that, no matter whether the user first single clicks the button 111 and holds down the button 111 and then double clicks the button 112 and holds down the button 112 at the same time, or the user first double clicks the button 112 and holds down the button 112 and then single clicks the button 111 and holds down the button 111 at the same time, the button sensing circuit 124 can both sense that the state the button 111 is the single-click long-press state and at the same time the state of the button 112 is the double-click long-press state.

Then, in some embodiments, when the state of the button 111 is the single-click long-press state and the state of the button 112 is the double-click long-press state at the same time, the processor 122 generates the cut range starting signal and transmits the cut range starting signal to the computer device 130. Next, the computer device 130 will wait to receive the cut signal from the mouse device 110 as an end signal to determine a range to be cut.

After the state of the button 111 is the single-click long-press state and the state of the button 112 is the double-click long-press state at the same time, the button sensing circuit 124 senses that the button 111 and the button 112 are released from the single-click long-press state and the double-click long-press state at the same time if the user releases both the button 111 and the button 112. The button sensing circuit 124 transmits the sensed state information of the button 111 and the button 112 to the processor 122. The processor 122 generates the cut signal and transmits the cut signal to the computer device 130, so that the processor 132 performs the cut operation according to the previously received cut range starting signal and the currently received cut signal.

In greater detail, if it is assumed that when the state of the button 111 is the single-click long-press state and at the same time the state of the button 112 is the double-click long-press state, the cursor 154 in FIG. 1 is located at the position of the character B on the screen window 152. The processor 132 sets the cut range start point at the position of the character B. Then, under the circumstance that the button 111 and the button 112 are still in the single-click long-press state and the double-click long press state at the same time, the mouse device 110 is moved from the position of the character B to the position of the character D. At this time, the button 111 and the button 112 are released from the single-click long-press state and the double-click long-press state at the same time after the mouse device 110 is moved to the position of the character D. The processor 132 sets an end point at the position of the character D. The processor 132 selects the character B, the character C, and the character D on the screen window 152. Finally, the processor 132 cuts the character B, the character C, and the character D according to the cut signal under the circumstance that the states of the button 111 and the button 112 are released from the single-click long press state and the double-click long press state at the same time.

After the processor 132 cuts the character B, the character C, and the character D according to the cut signal, the cursor 154 will be moved to another position on the screen window 152 if the user moves the mouse device 110. For example, it is assumed that the cursor 154 is moved after the character I. At this time, the processor 122 generates the at least one type of paste signal according to the at least one of the state of the button 111, the state of the button 112, and the state of the button 113, and transmits the paste signal to the computer device 130. The computer device 130 performs the paste operation after the character I according to the paste signal.

The various types of paste signals and their corresponding operations have been described in the previous paragraphs, and a detailed description is not provided here.

In some embodiments, the button sensing circuit 124 may be a circuit or some other component having a button sensing function. In some embodiments, each of the processor 122 and the processor 132 may be a server, a circuit, a central processor unit (CPU), a microcontroller unit (MCU) having functions, such as caching, computing, data reading, receiving signals or messages, transmitting signals or messages, etc., or some other component with equivalent functions.

In summary, the present disclosure provides a mouse device and a control method, so that the embodiments of the present disclosure can be operated through one additional button or only through the left and right buttons of a traditional mouse. As compared with the traditional mouse when performing the functions, such as copy, cut, paste, etc., the multiple steps "Confirm that the mouse cursor is located in the highlighted area and single click on the right mouse button", "Move the mouse cursor to select "Copy" in the pop-up list dialog box", "Single click on the right mouse button to generate the list dialog box", and "Move the mouse cursor to select one of the various "Paste" options in the pop-up list dialog box and paste" can be omitted to improve efficiency of word processing. As compared with the method of using a mouse in cooperation with a keyboard to achieve copying, cutting, and pasting, the mouse device and method provided by the present disclosure do not need to use the keyboard and the mouse at the same time and can be achieved by using only one hand, which is more convenient. In addition to that, by disposing the additional button on the side housing surface of the mouse device, it is more convenient to operate the embodiments of the present disclosure.

Various functional components have been disclosed herein. For those of ordinary skill in the art, the functional components may be implemented by circuits (whether application specific circuits or general purpose circuits operating under the control of one or more processors and coded instructions) or even firmware and software.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims and their equivalents.

What is claimed is:

1. A mouse device, coupled to a computer device, comprising:
    a first button;
    a second button; and
    a processor, configured to:
        transmit a copy range starting signal corresponding to a start point of a copy range to the computer device when the first button and the second button are both held down and are both in a single-click long-press state at the same time;
        transmit a copy signal corresponding to an end point of the copy range to the computer device when the first button and the second button are both released from the single-click long-press state at the same time;
        transmit a paste signal to the computer device according to a click of the first button or the second button;
    wherein the computer device sets the start point of the copy range according to the copy range starting signal and the end point of the copy range according to the copy signal correspondingly on a screen window,
    wherein the copy signal activates a copy operation of the computer device according to the start point and the end point of the copy range.

2. A control method, adapted for a mouse device coupled to a computer device, the control method comprising:
    transmitting, by a processor of the mouse device, a copy range starting signal corresponding to a start point of a copy range to the computer device when a first button and a second button of the mouse device are both held down and are both in a single-click long-press state at the same time;
    transmitting, by the processor of the mouse device, a copy signal corresponding to an end point of the copy range to the computer device when the first button and the second button of the mouse device are both released from the single-click long-press state at the same time, wherein the computer device sets the start point of the copy range according to the copy range starting signal and the end point of the copy range according to the copy signal correspondingly on a screen window, wherein the copy signal activates a copy operation of the computer device according to the start point and the end point of the copy range; and
    transmitting, by the processor of the mouse device, a paste signal to the computer device according to a click of the first button or the second button.

* * * * *